United States Patent [19]

Taylor

[11] Patent Number: 5,410,691
[45] Date of Patent: Apr. 25, 1995

[54] METHOD AND APPARATUS FOR PROVIDING A NETWORK CONFIGURATION DATABASE

[75] Inventor: Bradley Taylor, Palo Alto, Calif.

[73] Assignee: Next Computer, Inc., Redwood City, Calif.

[21] Appl. No.: 174,213

[22] Filed: Dec. 28, 1993

Related U.S. Application Data

[63] Continuation of Ser. No. 520,091, May 7, 1990, abandoned.

[51] Int. Cl.⁶ .................. G06F 15/16; G06F 12/00
[52] U.S. Cl. .................. 395/600; 395/650; 395/425; 364/DIG. 1
[58] Field of Search .......... 395/600, 425, 650

[56] References Cited

U.S. PATENT DOCUMENTS 4,731,734  3/1988  Gruner et al. .......... 395/425
4,827,411  5/1989  Arrowood et al. ........ 364/300
5,055,999  10/1991  Frank et al. ............ 364/200

*Primary Examiner*—Thomas G. Black
*Assistant Examiner*—Peter Y. Wang
*Attorney, Agent, or Firm*—Hecker & Harriman

[57] ABSTRACT

A network database. The network database is arranged in a plurality of domains in a logical hierarchy. Each domain of the hierarchy represents a body of information associated with a logically related group of users or related group of computers. A relative naming scheme is implemented in which a domain stores the names of only its parent domain and child domains. This permits reconfiguration of the network to be accomplished without changing the database structure. Each domain stores information in a hierarchical structure known as a "directory." Each directory consists of a list of zero or more "properties," each having an associated name and ordered list of values.

5 Claims, 12 Drawing Sheets

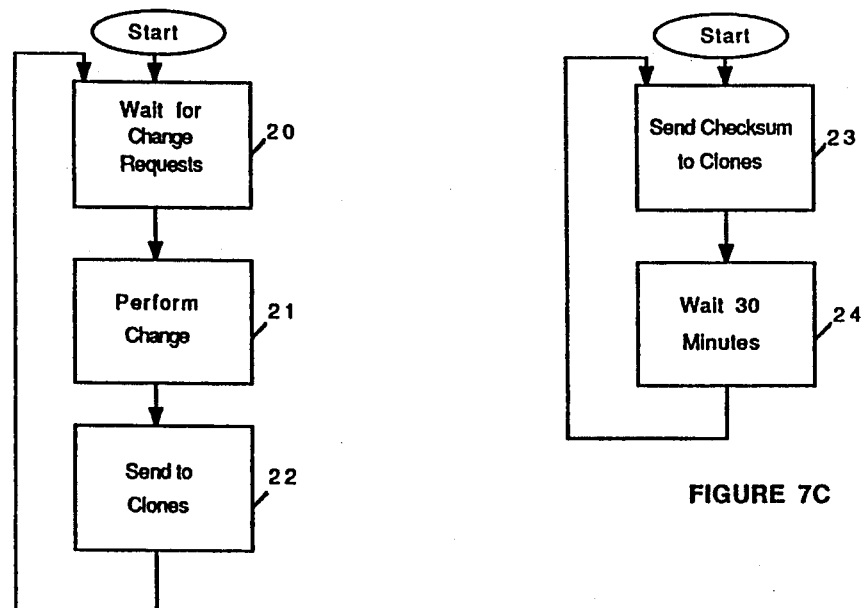
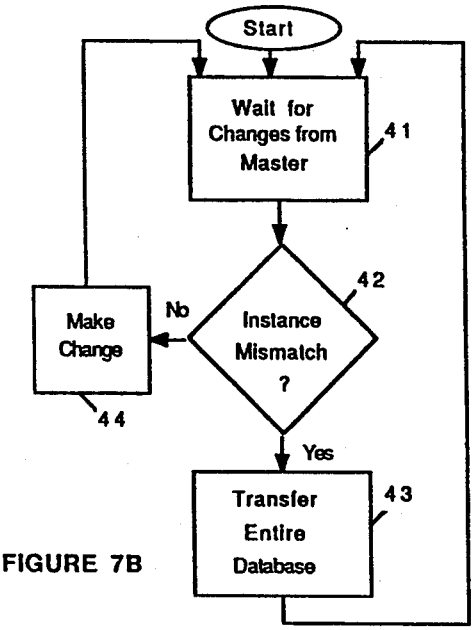
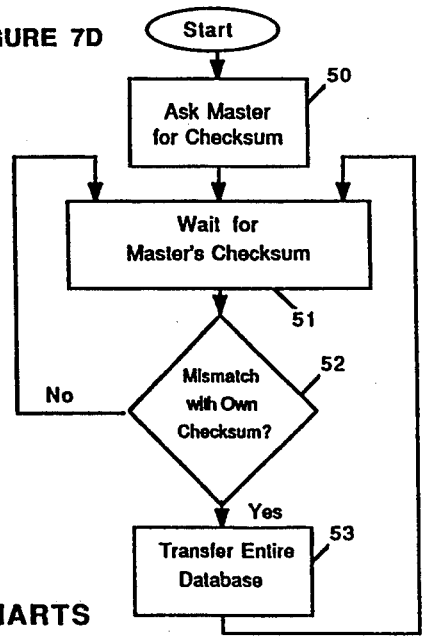
MASTER FLOWCHARTS
FIGURE 7A
FIGURE 7C
FIGURE 7B
FIGURE 7D
CLONE FLOWCHARTS

METHOD AND APPARATUS FOR PROVIDING A NETWORK CONFIGURATION DATABASE

This is a continuation of application Ser. No. 07/520,091, filed May 7, 1990, now abandoned.

BACKGROUND OF THE INVENTION

1. Field of the Invention

This invention relates to the field of networks and in particular to maintaining configuration information in a collection of databases.

2. Background Art

In modern computing environments, it is commonplace to employ multiple computers or workstations linked together in a network to communicate between, and share data with, network users. A network also may include resources, such as printers, modems, file servers, etc., and may also include services, such as electronic mail. Information about the computers on the network, and the users, resources and services available to those computers, is referred to as "configuration information."

In some prior art systems, configuration information is typically stored in flat ASCII files. A disadvantage of storing configuration information in such files occurs when users seek access to configuration information to identify available resources and there is typically more information available in that file than the user requires. As a result, the user must search through unneeded information to find the information desired. It may be desired to define different levels and amounts of information associated with different levels of users.

One disadvantage of many prior art network systems is that only one level of user is defined. In other words, each user or computer is considered "equal" in the network hierarchy. This limits the ability to define different levels of information Another drawback of prior art network systems is that they lack flexible directory schemes. Only one level of directories typically can be defined, and directories are typically "read only." Writing to directories is possible only in a few special circumstances. Another disadvantage of some prior art systems is that if backup copies of the network database are stored on different computers, the only method of updating the database is to transfer complete copies of the master database to the backup systems.

Other prior art network databases also typically have highly restrictive directories. The ISO Directory Service (X.500) is one such prior art network system. The directories require a schema to describe the structure of the directory. There is typically no mechanism for creating new schemas, so creating new directories is not possible. In addition, there is no replication capability to accomplish network database backup.

Some prior art network systems support multiple levels of hierarchy such that different user levels may be defined. However, in such systems, the number of levels is limited, and all levels must be used. For many networks, hierarchical flexibility is highly desirable.

Another disadvantage of prior art network systems is their general lack of flexibility in the ability to make desired changes to the structure of the network. For example, when new computers or users are added, moved or deleted, a network administrator is often required to implement the changes.

Therefore, one object of this invention to provide a network system with a plurality of user hierarchies.

Another object of this invention is to provide a network system that has flexible directories which permit reading and writing of properties and permits the creation of new directories.

It is yet another object of this invention to provide a network system that allows network operations to be performed from any location on the network.

Another object of this invention is to provide a network system that allows for incremental replication of the network database.

Another further object of this invention is to provide a network system that permits flexible reorganization of the network structure.

It is another object of this invention to provide a network system that allows security levels to be easily defined.

Other objects and advantages of the present invention will become apparent upon reading the specification and drawings, in which like reference numerals refer to like parts throughout.

SUMMARY OF THE INVENTION

This invention is directed to a network database system for storing and sharing information on a network. The information may be network configuration data, such as user names, user ID's, computer addresses, passwords, personal data, user preference default settings, printers, services, etc. The network database information can also include any data that is to be accessible to a number of network users at the same time.

The network database system of this invention is arranged in a hierarchy of "domains," each of which includes certain information. While a domain can store virtually any information, it contains information about other domains, and typically contains information about the users associated with the computers and any groups the users may belong to, along with resources and services available to that group. A domain serves one or more computers of network.

At the top of the domain hierarchy is the root domain. There may be beneath the root domain subdomains that contain zero or more domains. The information available to each domain is organized into a hierarchy of directories. A directory might contain a list of users, for a list of groups of users. Each directory stores information as ordered lists of "properties". Each property consists of a "name" to identify the property and an ordered list of values associated with the name.

This invention also uses a method referred to as "relative naming." Relative naming refers to the fact that each domain in the domain hierarchy is named relative to its parent domain. A parent domain is the domain logically above a domain in the hierarchy. A domain need not store information about any other domains other than its parent domain and children domains. This allows restructuring of, additions to, or deletions from the domain hierarchy to be implemented by updating only those domains affected by the change.

BRIEF DESCRIPTION OF THE DRAWINGS

FIG. 7A is a flow diagram of a master/clone update cycle.

FIG. 7B is a flow diagram illustrating a clone update cycle.

FIG. 7C is a flow diagram of a master server check sum cycle.

FIG. 7D is a flow diagram illustrating a clone check sum cycle.

DETAILED DESCRIPTION OF THIS INVENTION

A method and apparatus for providing a network database is described. In the following description, numerous specific details, such as number of nodes, command formats, etc., are set forth in order to provide a more thorough description of the invention. It will be apparent, however, to one skilled in the art, that this invention may be practiced without these specific details. In other instances, well known features have not been described in detail so as not to obscure the invention.

Computers, workstations and other devices are often linked together in a network to enable multiple users to communicate and to share information. Configuration information for the network, that is, information relating to the computers, users, resources and services available to the network, is stored in a network database. However, not all of the information stored in the network database is of interest to all users. For example, a network may consists of computers in remote, physical locations. Suppose that printers are resources that are shared on this network and that a first printer is located in a first building and a second printer is located in a second building. The users in the first building typically have no interest in the status of the second printer because it is unlikely that those users will use that second printer. Rather, the users in the first building are typically interested only in status information concerning the first printer. Therefore, the network database of this invention is configured to create subsets of configuration information associated with logically related groups of computers and/or groups of users.

To organize network information and the network itself into a system that reflects the organization of the network users, the network database of this invention has a hierarchical structure. A typical hierarchical chart is used here to help illustrate the present invention. By way of example, an enterprise named "company" is organized into a number of divisions and departments as illustrated in the organization tree of FIG. 1A. At the top of the tree is the company itself. At the next successive level, the company is defined as having three divisions; "marketing," "engineering" and "corporate." The marketing division is defined as having two departments; "print" and "TV". The engineering division is also defined as having two departments; "research" and "development." The "corporate" division is defined as having no departments in this example.

Figure 1A:
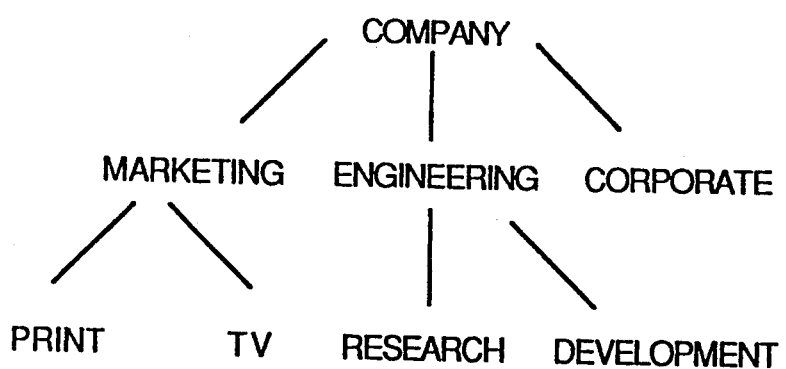
FIG. 1A is a hierarchical view of an organization.

A network database of the information to be shared among the divisions and departments of the company can be structured analogously to this tree structure of the company of FIG. 1A. The information to be stored in the network database includes administrative information, such as a user's name, network address, the name of the user's computer and the user's relationship, if any, to other users in the organization. Non-administrative information may also be stored in the network database of this information. For example, telephone numbers and addresses of users may be included, "log in" procedures, default user preference settings, etc., may also be included.

As more fully described below, this network database information is distributed among a plurality of domains. Each domain includes network database information that relates to, and is used by, a particular group of users on the network.

Figure 1B:
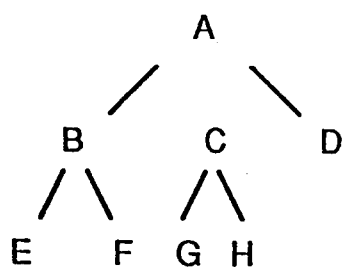
FIG. 1B is a view of a network configuration of the organization of FIG. 1A.

A hierarchical tree is defined as in FIG. 1B representing the collection of network information groups. For example, node A corresponds to the collection of information that relates to, and used by, the entire company. Node B represents the information relating to the marketing group, node C corresponds to engineering and node D to corporate. The marketing node B has two departments, print, (node E) and TV, (node F). The engineering division, node C, has two departments—research, (node G) and development, (node H). Each node at a logical level above another node is known as a "parent" node with respect to the lower node. Each lower node is considered to be a "child" node with respect to the higher node. Certain nodes may be both parent and child. For example, the marketing node B is a child of A but a parent of E and F.

Domain Hierarchy

Figure 2:
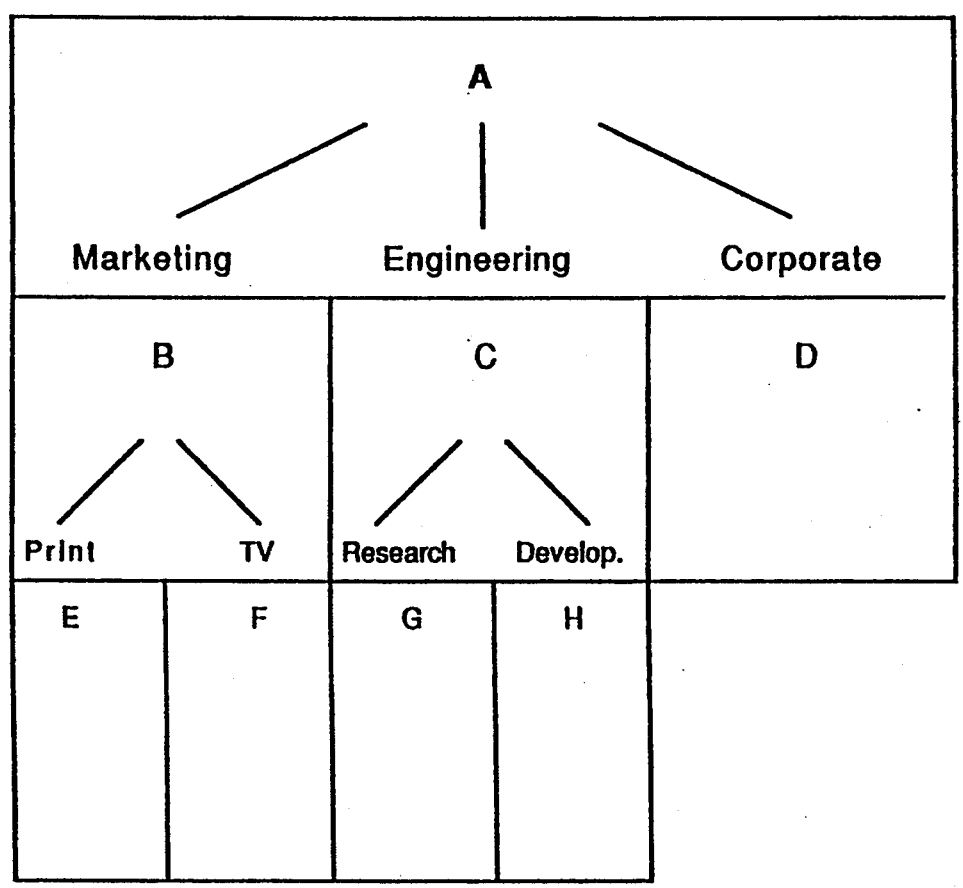
FIG. 2 is a view of the domain hierarchy of the network of FIG. 1B.

Each collection of information represented by the structure of FIG. 1A is referred to as a "domain" in this invention. Here, a domain consists of one or more network computers and the information associated with the computer's configuration. As shown in FIG. 2, eight domains are defined in the structure of the example company. For purposes of example, each domain is identified by its associated letter A through H. In the present invention, each domain contains the identification of any child domains associated with that particular domain. For example, domain A, the root domain, contains identification information associated with marketing, engineering and corporate domains. Similarly, domain B (the marketing domain) contains the names of domains E and F ("print" and "TV"), which are the children domains of B. Domain C, the engineering domain, contains the identification information associated with domains G and H ("research" and "development"), which are the children domains of C. Domains E, F, G and H do not contain any identification information because these domains do not have any associated children domains. Similarly, domain D ("corporate") does not contain any identification information.

The domain hierarchy of this invention may consist of only one domain, or it may consist of a plurality of domains having any number of levels of associated branches and children domains.

Relative Naming

This invention uses a technique referred to herein as "relative naming" of domain hierarchies. Each domain only contains information about the domains immediately above it in the hierarchy or immediately below it, (if any exist). If this convention is maintained consistently throughout the network domain hierarchy, a communication path can be created between any two domains in the hierarchy.

For example, a communication path can be created between domain C and domain E as shown in FIG. 2. Domain C only contains the names of its two children domains ("research" and development") G and H, and information indicating that domain A is its parent domain. Domain C contains no information about domain E or about any other domain on the network. Domain E only contains information indicating that domain B is its parent. Similarly, domain E contains no information about domain C or about any other domain. To establish a communication path between domain C and domain E, domain C can access domain A to achieve such communication. Domain A, storing information about its children domains, can then access domain B, (marketing). Domain B, storing information about its parent (domain A) and its children, (domains E and F) can access domain E and thus a link between domains C and E is created.

By using the relative naming scheme of the present invention, information about the absolute position of a domain in the domain hierarchy is unnecessary.

Directories

Within each domain of the domain hierarchy, information is contained in a hierarchical structure known as a "directory tree." A directory tree is represented here by an inverted tree having its root at the top and branches extending downward. The directory at the top of the tree is called the root directory. The root directory branches into several other directories, called its "subdirectories" (because of their relation to the root directory). Each subdirectory may also have its own associated subdirectories. A path from the root directory to a subdirectory is referred to as a "branch" of the tree. For convention a directory is "above" its associated subdirectories. A directory is a parent of its associated subdirectories. Conversely, a directory is a subdirectory, or child, of its associated parent directory.

Figure 3:
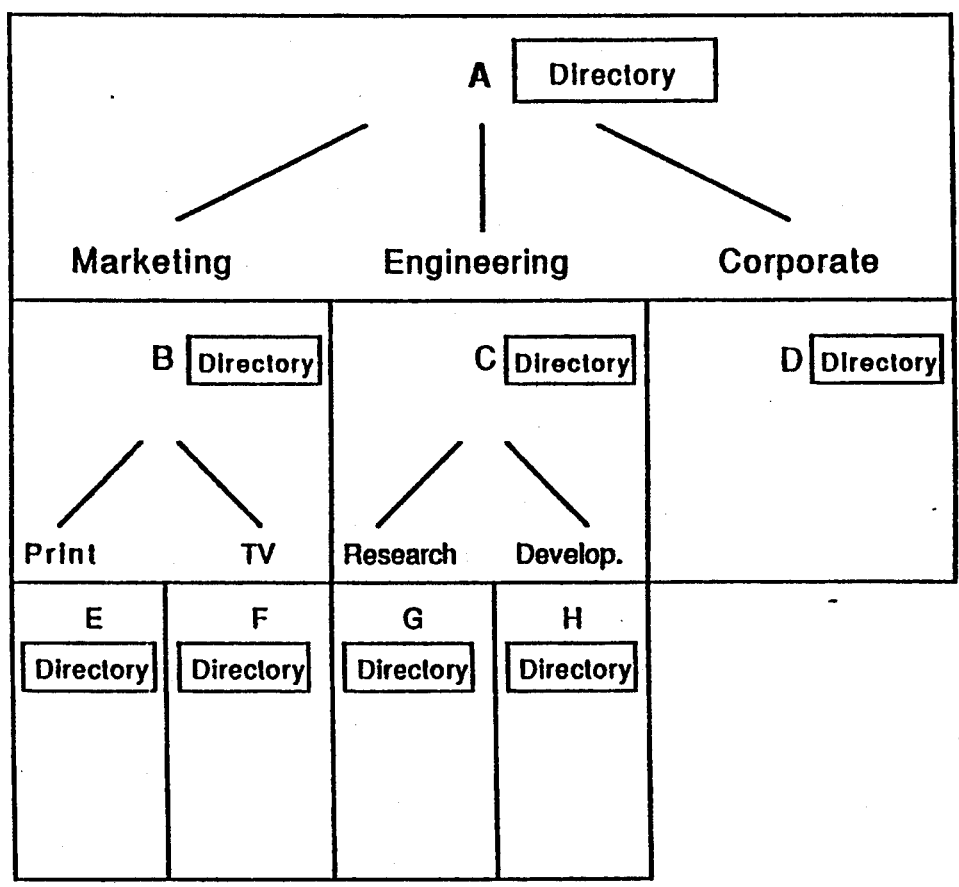
FIG. 3 is a view of the domain hierarchy of FIG. 2 and associated directories.
Figure 5A:
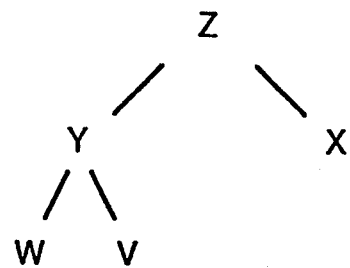
FIG. 5A is a detailed view of a directory.

Referring to FIG. 3, each domain of the domain hierarchy has an associated directory tree (e.g., A, B and C directory trees of Domains A, B and C, respectively). A directory tree is shown in greater detail in FIG. 5A. It has two "subdirectories," Y and X. Y in turn, has two other subdirectories, W and V. Directory X has no subdirectories.

Figure 5B:
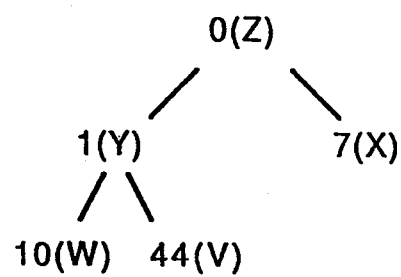
FIG. 5B is a view of directory ID's.

Each directory has a numeric object identification ("ID") that is unique for the domain containing such directory. For example, the directories shown in FIG. 5A may have ID's as listed in FIG. 5B. Directory Z is identified by the ID 0; directory Y by the ID 1; directory X by the ID 7; and directories W and V by the ID's 10 and 44, respectively. Each numeric ID within a domain is unique. However, the same numeric ID may be used in different domains. If a directory is moved to another domain containing a directory with the same ID, the ID of the directory being moved must be modified to maintain uniqueness.

Directories may be arbitrarily created and assigned a unique ID. Similarly, directories may be arbitrarily destroyed if they do not have subdirectories. That is, the lowest directory of a branch may be arbitrarily removed. But directories having associated children cannot be removed unless the children directories are removed first.

Each directory also includes an ordered list of zero or more "properties." Each property has a "name" to identify the property and an ordered list of 0 or more "values." A property defines a relationship between a name and its associated values. The name of a property is comprised of alphanumeric characters, as is each value. An example of a property list is as follows:

| Property 1: | |
|---|---|
| name: | "User Name" |
| value 1: | "Penny Smith" |
| Property 2: | |
| name: | "Phone Numbers" |
| value 1: | "555-1775" |
| value 2: | "555-1675" |
| Property 3: | |
| value 1: | "Full Time Employee" |
| (no values) | |

There are three properties in the property list described above. Property 1 has "user name" assigned to the name field and a single associated value, "Penny Smith." Property 2 has "phone numbers" assigned to the name field and has two associated values. Value one is "555-1775" and value two is "555-1675." Property 3 has "full time employee" assigned to the name field and a 0 length value list, that is, there are no values associated with this property.

In this invention, property lists may be modified by users. For example, a user may wish to delete Property 2 from the directory. If the removal is successful, the property list will then appear as follows:

| Property 1: | |
|---|---|
| name: | "User Name" |
| value 1: | "Penny Smith" |
| Property 2: | |
| value 1: | "Full Time Employee" |
| (no values) | |

| Name "_writers" | |
|---|---|
| Value 1 | "Ellen" |
| Value 1 | "Frank" |

In this invention, the property list is "ordered" such that property 3 shifts up one level and becomes property 2.

Because the property lists in this invention are easily modified, a scheme to prevent erroneous modifications is implemented. Again referring to the original property list, for example, a first user may try to delete property 2 from the directory while a second user simultaneously attempts to modify property 2. If the first user completes its operation first, property 2 will be deleted from the list, and property 3 will become property 2. Consequently, the request of the second user to modify property 2 is no longer valid, because what is now property 2 is the former property 3.

To prevent this invalid modification, each directory has a "numeric instance ID number" that is assigned when a directory is created. Whenever a directory is modified, the instance ID is changed. When a user wishes to change the information in a directory, it must present both the directory ID and what it believes is the correct instance ID. If the instance ID presented is not the current instance ID of the directory, the modification request will be rejected. This operation is illustrated by the flow diagram in FIG. 6.

Figure 6:
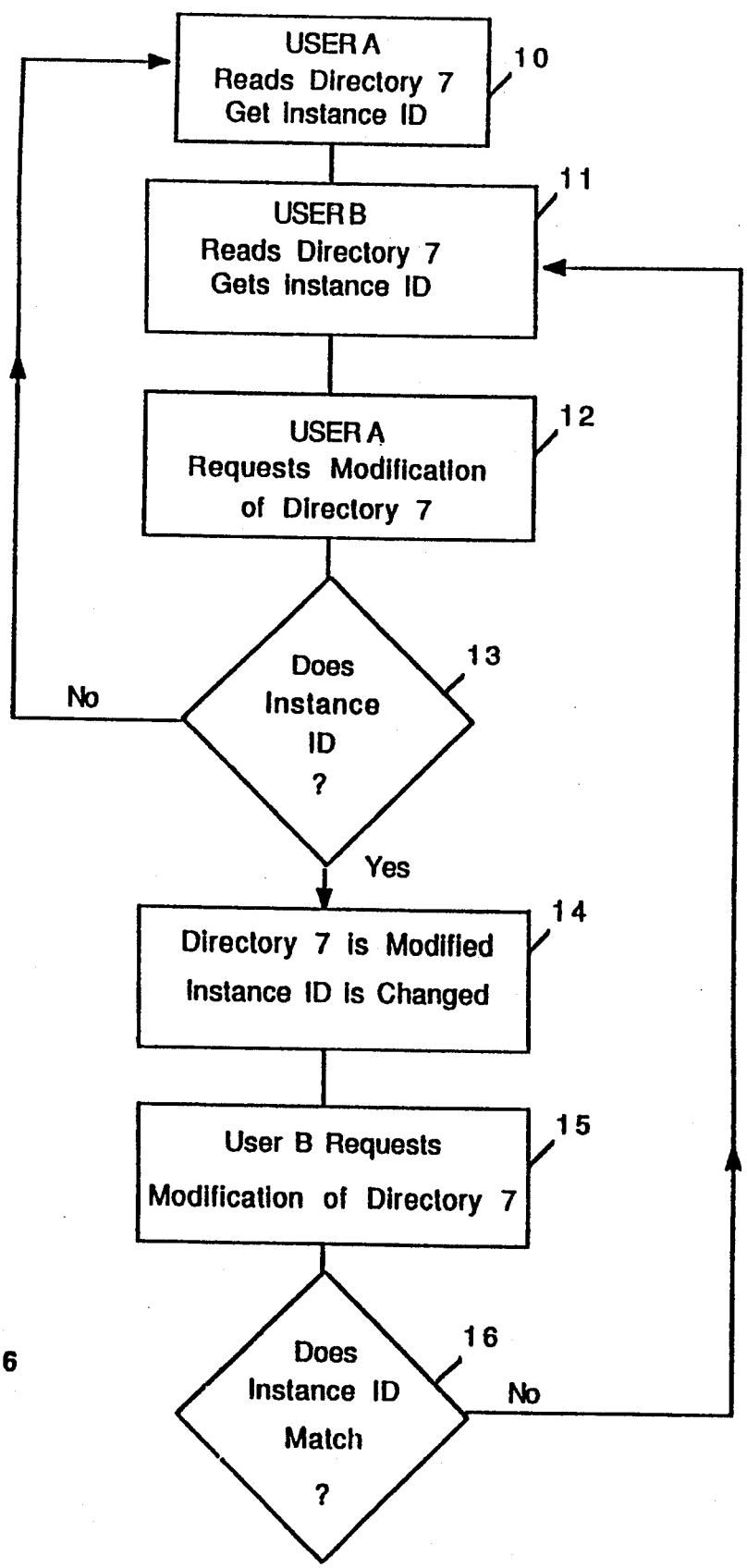
FIG. 6 is a flow diagram of a directory modification.

The example of FIG. 6 illustrates the attempts of users A and B to modify a directory referred to as directory 7. At block 10, user A reads directory 7 and obtains the instance ID number of 10. At a later time, shown in block 11, user B reads directory 7 and also receives the instance ID number 10. At block 12, user A requests a modification of directory 7 and presents instance ID number 10. At decision block 13, that instance ID submitted by user A is compard to the present instance ID. If they match, the modification request is granted at block 14. If there is no match, the modification request is refused and the user must read the directory again to obtain the current instance ID. If the request at decision block 13 is granted, the user proceeds to block 14, modifies directory 7 and the instance ID of directory 7 is changed (in this case, to 14).

At step 15, user B requests modification of directory 7 and presents what it believes to be the current instance ID of 10. At step 16, the offered instance ID is compared to the current instance ID. The instance ID's do not match. Thus, user B returns to block 11 to read the directory and obtain the current instance ID.

In the preferred embodiment of this invention, the instance ID is defined to be zero when a directory is created. Thereafter, the instance ID is incremented by one for each change to the directory. In this manner, the instance ID indicates the number of changes made to a directory. Alternatively, the instance ID can be a random number generated by any well known method for generating random numbers.

Physical Storage

Figure 4:
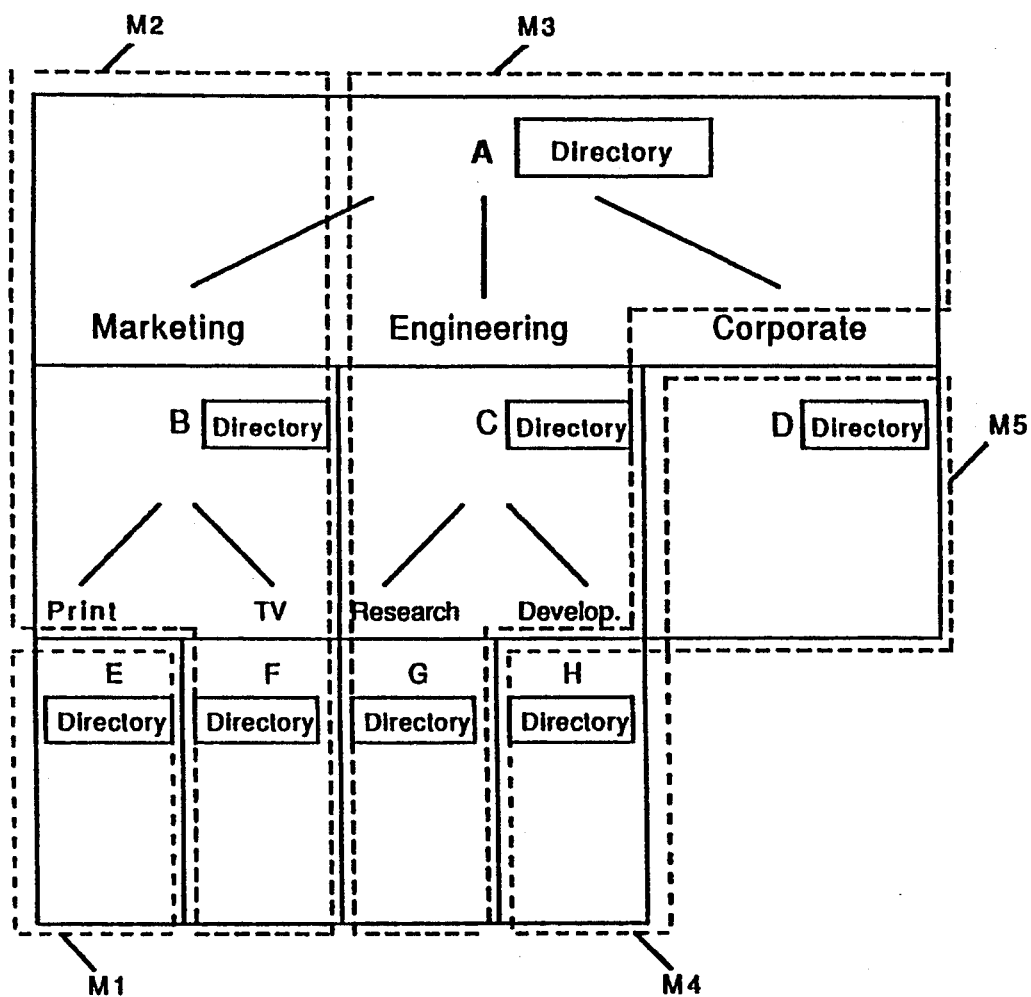
FIG. 4 is a view of the domain hierarchy of FIG. 3 illustrating one possible computer assignment.

The domain information of this invention may be stored on one or more individual computers. Each computer may store an arbitrary number of domains. FIG. 4 illustrates one possible arrangement of the physical storage of the domain hierarchy. In this case, one computer identified by dashed line M1 stores the domain information for domain E. A second computer identified by the dashed line M2 stores domain information for domain F, domain B and part of domain A. Domain A is also stored in the computer identified by dashed line M3, which also stores information for domain C and domain G. A fourth computer identified by dashed line M4 stores the information for domain H and a computer identified by dashed line M5 stores domain information for domain D. Thus, five computers are used to store the domain information for eight domains. As noted, domain A is stored on two of these machines, M2 and M3.

Replication of Domain Information

It may be convenient to have the information of a single domain stored on several computers. This can improve performance by distributing the access load for acquiring information for a domain from one computer to several computers. It also enables the information in the domain to be accessible to network users so long as one of the computers serving the domain is fully functional. The computers that store domain information in the present invention are separated into two classes, "master server" and "clone server." The clone servers store the same information as the master servers. A master server allows other computers to both read both information from and write information to the domain stored on the master server. Each domain has a master server. That master sever may be the master for many domains. Domain information stored on clone servers is "read only". There may be any arbitrary number of clone servers per domain. To change information in a domain, the request for a change must be sent to the master server. To read domain information, a request may be directed to any of the clone servers of the domain, or to the master server.

This invention provides a method for updating information on the clone servers when that information is changed on their associated master. Flow charts of the method of replicating information to the clone server are illustrated in FIGS. 7A-7D. Referring first to FIG. 7A, at block 20, a proposed change to information stored on the master server is provided to it. At block 21, the database of the master server is changed in accordance with that proposed change. At step 22, the master server instructs the clone servers to execute the change and the system returns to step 20 to await the next change request.

FIG. 7B illustrates the steps that occur at a clone server when it has received an instruction to change its database (such as step 22 of FIG. 7A). At step 41, a clone server waits for change requests from the master server. These change requests will direct the clone to change a particular directory. As noted with respect to FIG. 6, each directory has an associated instance ID. At decision block 42, a comparison between the instance ID provided by the master server and the instance ID currently stored by the clone server is made. If there is a mis-match of the instance ID's, the clone server assumes it does not have a current database and at step 43 transfers the entire database of the master server to the done server. It then returns to block 41 to await future changes from the master server. If there is no mis-match at decision block 42, the clone server makes the change at block 44 and returns to block 41.

A check sum system is used to periodically update the clone servers to provide data integrity and ensure that the clone server data is current with the master servers. Referring to FIG. 7C, the master server, at step 23, periodically generates a check sum and provides that check sum to the clone servers. The system then proceeds to block 24 and waits for thirty minutes before repeating the check sum process at step 23.

When a clone server has been offline, that is, out of service or functionally removed or disconnected from the network, validation of its database must be determined when it returns online. This validation is illustrated in FIG. 7D. At step 50, a clone which is returned to online status requests the check sum from the master server. At step 51, the clone server waits for the master's check sum to be provided. When the check sum is provided, a comparison at decision block 52 is made to determine if the check sum of the master server matches the check sum of the clone server. If the check sum matches, the system returns to step 51 and the clone server waits for the master server to provide its check sum, such as at the periodic cycle illustrated in FIG. 7C. If there is a mismatch between the master server check sum and the clone server check sum, the system proceeds to step 53 and the clone server tranfers the entire database of the master server to the clone server. The system then proceeds to step 51 and awaits a periodic check sum cycle.

Access Control

The present invention implements access control as a directory property. To provide domain access control, that is, to limit the number of users who can change information in a domain, the present invention implements two schemes to restrict access to domain information. These schemes are integral with a domain directory, and limit the ability to modify other properties in the directory. The first scheme is called "_writers." _writers lists the names of users that are permitted to modify that particular directory. For example, a directory may have a=a property named "_writers" as follows:

| Name "_writers" | |
| --- | --- |
| Value 1 | "Ellen" |
| Value 2 | "Frank" |

In this example, two users, named Ellen and Frank, are authorized to modify this directory as desired. They may add, delete or change any property of the directory, or create or destroy any subdirectory, provided they are authenticated as proper users. Authentication may be accomplished by a password scheme, where the user provides a user name (e.g., Ellen) and a password to the master server. The master server then verifies whether the password provided matches a password for that user.

Data security may be directory wide, or may be selectably provided for all properties or any group of properties within a directory. In the present preferred embodiment, this is accomplished using a prefix applied to a property name referred to as "_writers_". For example, a directory may have properties as follows:

| Property 1: | |
| --- | --- |
| name: | "name" |
| value 1: | "Ellen" |
| Property 2: | |
| name: | "password" |
| value 1: | "topsecret" |
| Property 3: | |
| name: | "_writers_password" |
| Value 1: | "Ellen" |

This directory corresponds to information about Ellen's password. It stores that password in property 2 ("password") but allows Ellen to change it (if proper authentication is provided), because the third property lists Ellen as one of the users authorized to modify the "password" property.

A special value may be given to any "_writers" or "_writers$_{13}$" prefixed property to permit any user to modify the property without the need for authentication. This special value is "*". In the following example, the property list appears as:

| Property 1: | |
| --- | --- |
| name: | "name" |
| value 1: | "Ellen" |
| Property 2: | |
| name: | "password" |
| value 1: | "topsecret" |
| Property 3: | |
| name: | "_writers_password" |
| Value 1: | "*" |

This example is the same as the previous example, except that the use of "*" enables any user to modify the password property for Ellen. The values "_writer," "_writer_," and "*" are arbitrary values. Any alternative suitable value can be used in this invention.

Locating Servers

This invention provides a method for locating domain servers on the network. Each domain has a subdirectory immediately below the root directory with at least one property as follows:

| "Name" | |
| --- | --- |
| Value 1 | "machines" |

The domains directory has subdirectories identifying the various network computers of interest associated with the domain. One example of the property stored in the directory is shown below:

| Property 1: | |
| --- | --- |
| name: | "name" |
| value 1: | "machine-2" |
| Property 2: | |
| name: | "ip_address" |
| value 1: | "129.18.2.60" |
| Property 3: | |
| name: | "serves" |
| Value 1: | "Marketing/B" |
| Value 2: | "./A" |

The order shown above is for example only, and actual ordering can be different. In addition, other properties could be listed as well.

This directory provides information about the computers associated with the domain. First, the name of the computer is provided (e.g., computer 2). Next, the manner of addressing the computer on the network is provided. In the example above, a TCP/IP address is provided. In addition to TCP/IP addressing, other addressing schemes may be utilized to identify a physical location of the computer on the network. The third property shows parent and child domains of the domain under consideration. Here, there are two associated domains. One is domain B, immediately below domain A. This domain has the name "marketing". The second domain is the same domain as A. The special name "." is meant to refer to "this" domain, that is, the same domain. As another example, the information from domain B appears as follows:

| Property 1: | |
| --- | --- |
| name: | "name" |
| value 1: | "machine-2" |

-continued

| | |
|---|---|
| Property 2: | |
| name: | "ip_address" |
| value 1: | "129.18.2.60" |
| Property 3: | |
| name: | "serves" |
| Value 1: | "Frank/F" |
| Value 2: | "./B" |
| Value 3: | "../A" |

Here the name and address of the computer are the same as in the previous example. However, the "serves" information of property 3 is diferent. Three domains are stored on computer 2, namely, a domain immediately below domain B (child domain F), domain B itself and a domain immediately above domain B (parent domain A). The domain immediately above a particular domain is referred to by the prefix "..". Any name that does not have a "." or ".." as a prefix is a subdomain in the preferred embodiment. The prefixes "." and ".." are arbitrary and any suitable prefix can be utilized in this invention.

As previously discussed, there may be several computers that serve information in a domain. The master, however, can perform write operations. This invention identifies the maser server at the root directory of each domain. The root directory for the master server of domain A, for example, appears as follows:

| | |
|---|---|
| Name | "master" |
| Value 1: | "machine-2/A" |

The property name is "master." It has a single value and has two elements separated by the character "/". The first element is the name of the computer that is the master, (computer 2 in this example). The second element is the identifier for the domain information stored on this computer ("A").

Traversing the Hierarchy

If a user is associated with a given domain and desires to communicate with a subdomain, the user must determine addresses for each server of the given domain. The operations to do this are the following:
rootid=ROOT
machinesidlist=LOOKUP (rootid, "name", "machines")
machinesid=first entry of "machinesidlist"
serverlist=LIST (machinesid, "serves")

If the user is looking for servers of domain XXX, it scans the server list for values of the form "XXX/TAG". For each of these found, the user must also find the address of the server computer by reading the associated property (such as "ip_address").

Network Configuration

Figure 8A:
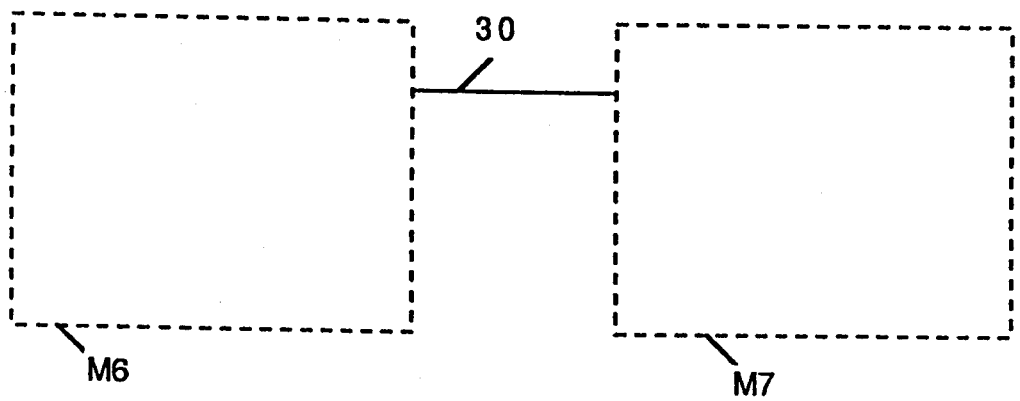
FIG. 8A is a block diagram of two computers coupled to a network link.
Figure 8B:
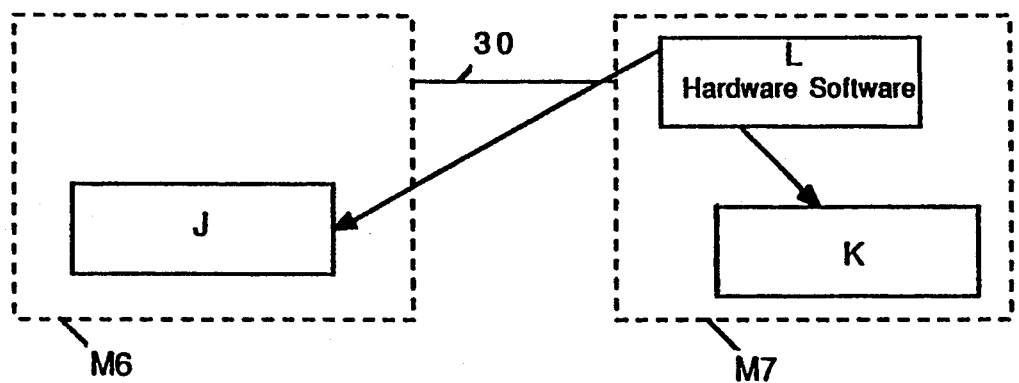
FIG. 8B is a block diagram of the domain assignment of the computers of FIG. 8A.

An example of creation of a network connection of two computers using this invention is illustrated in FIGS. 8A and 8B. Initially, two computers M6 and M7 are to be connected to the network 30. For purposes of this example, assume that computer M6 is a computer in a department known as "Hardware" and computer M7 is a computer in a department referred to as "Software."

Initially, a parent domain must be created. This domain, domain L, is illustrated as being located in computer M7. However, domain L could be in either or both of machines M6 and M7. The domain names of the Hardware and Software domains are stored in this parent domain L.

Next, a domain is created for each department. As shown in FIG. 8B, a domain J is created on computer M6 and a domain K is created on computer M7. Although separate domains are created for each department and are illustrated as being on separate machines, both domains could be on either of machines M6 or M7 or on any other machine, if desired.

Figure 9A:
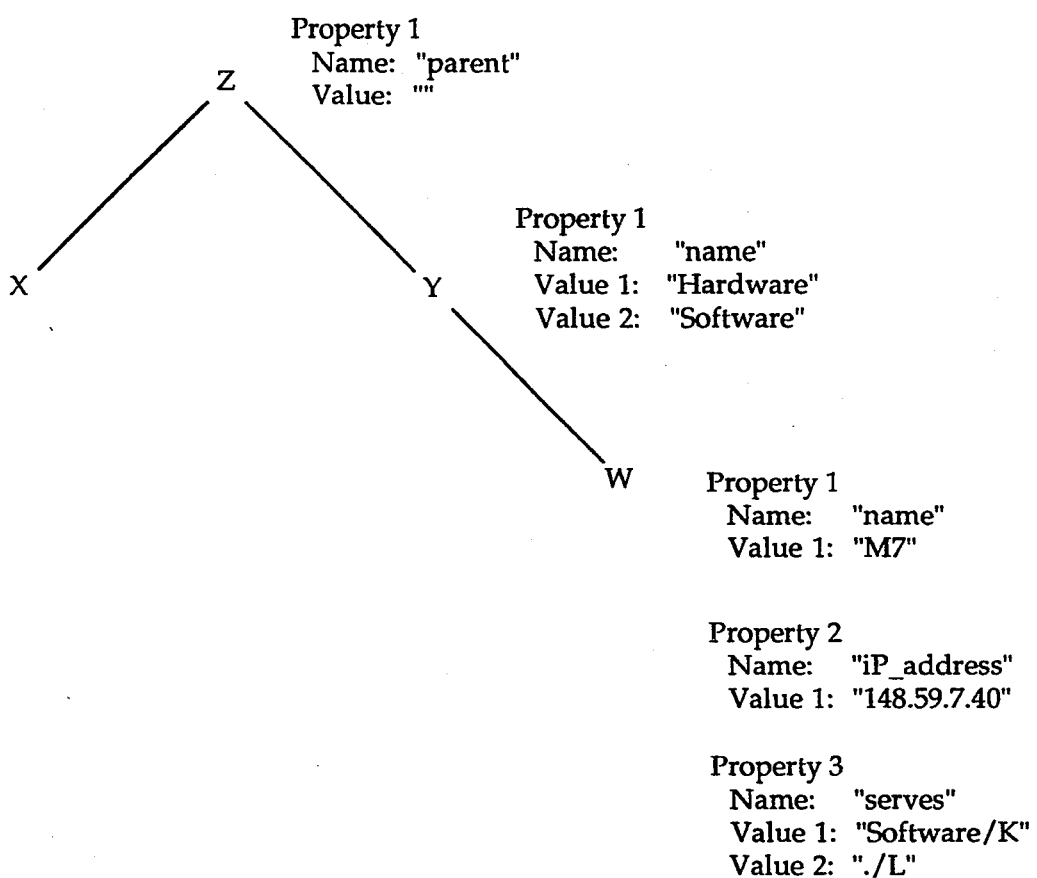
FIG. 9A is a diagram of the directory of domain L of FIG. 8B.

Next, directory trees are created for each domain. The domain server directory tree is illustrated in FIG. 9A. Directory Z is the root of the directory tree. A subdirectory, directory Y, identifies the children domains of the domain server L. The directory has one property, property 1, that names the child domains of that server. In this case, there are two values, value 1, (Hardware) and value 2, (Software) for the two children domains of the domain server L.

At the next logical level below directory Y is a subdirectory W. This subdirectory provides identifying information about the computer that is of interest to the domain server. Property 1 relates to the name of the machine. In this case computer M7 contains the domain server. The second property provides the network address of the computer and the third property lists the domains served by the computer 7. Here, the child domain "Software/K" is served by computer M7 as well as the server domain itself, identified by ".". As noted previously, a "." refers to "this" domain, that is, the same domain that contains the directory.

Figure 9B:
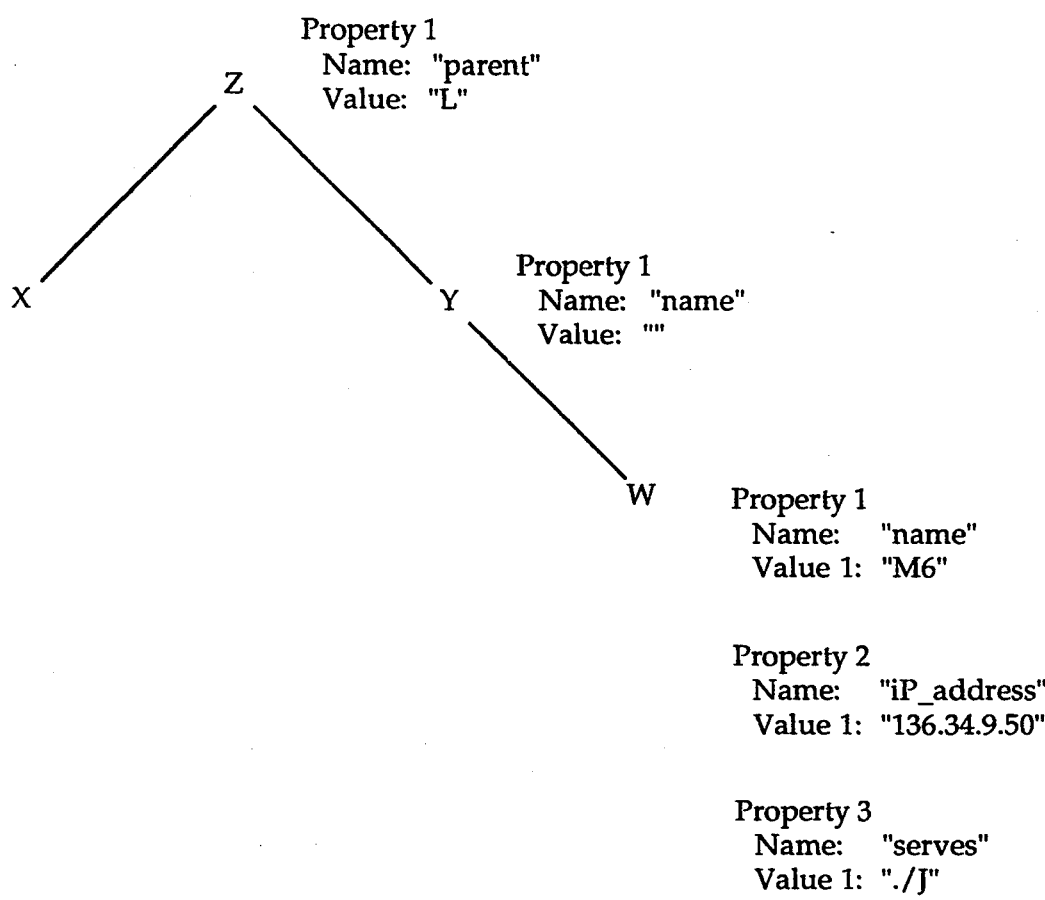
FIG. 9B is a diagram of the directory of domain J of FIG. 8B.

FIG. 9B contains the directory tree for the Hardware domain J. In this case, directory Y has no values because there are no children domains for this directory. The "machine" subdirectory W refers to computer M6, that provides a network address and notes that the computer serves the same domain, that is, domain J.

Figure 9C:
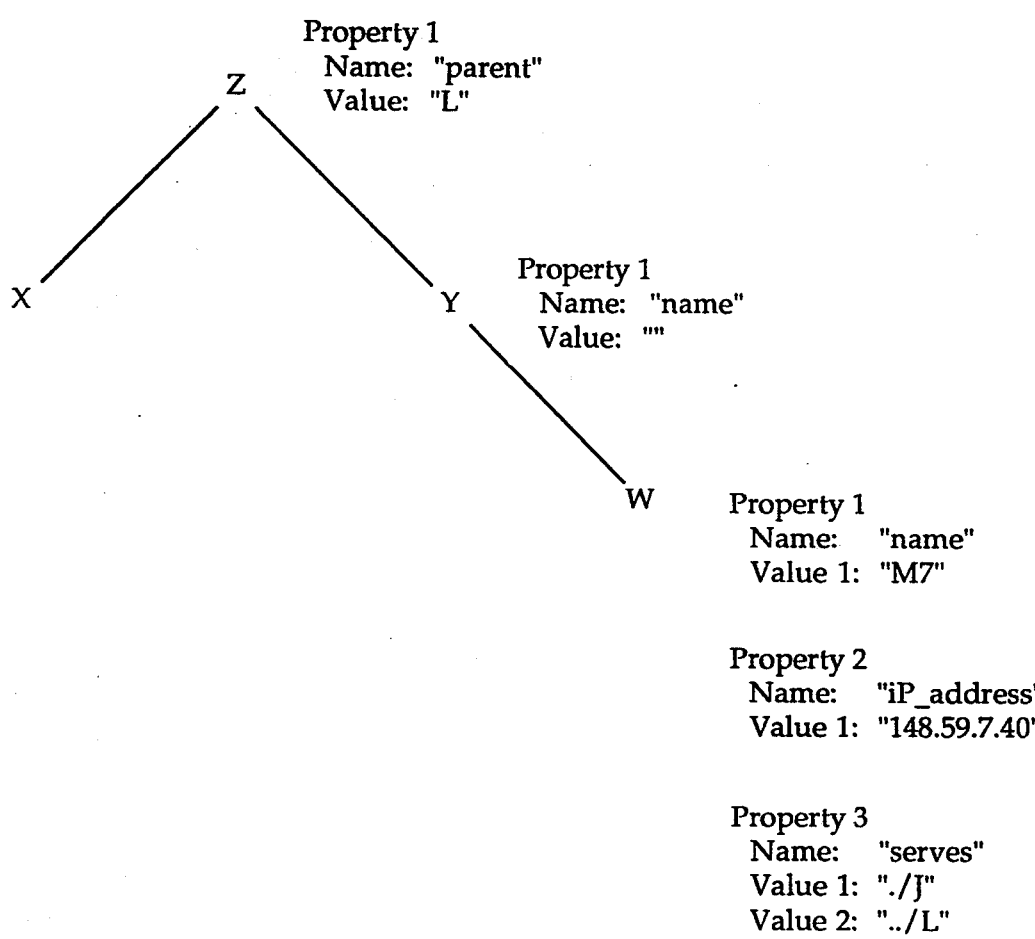
FIG. 9C is a diagram of the directory of domain K of FIG. 8B.

The directory tree for domain K is illustrated in FIG. 9C. Again, directory Y has no values because there are no children domains of this domain. In property 3 of subdirectory W there are two values, namely: "./K", which identifies that this domain, domain K, is served by this computer M7, and "../L", which identifies that the parent domain (L) is also served by computer M7.

Using the domain hierarchy scheme of this invention, other types of network changes, such as splitting of domains, adding a parent domain or adding children domains, can be easily implemented.

Domain Restructuring

In general, domain restructuring can be easily accomplished with the present invention. In the domain hierarchy, the topmost level is a single domain in this invention. When a domain is added or moved, the directories of the domains immediately above and below the domain must be updated, and the directory of the domain is updated to reflect its new parent and/or children domains. If the domain is moved from one computer to another, the directory information for the computer server must be updated. The directories on all other domains are unaffected by the restructuring.

Figure 10A:
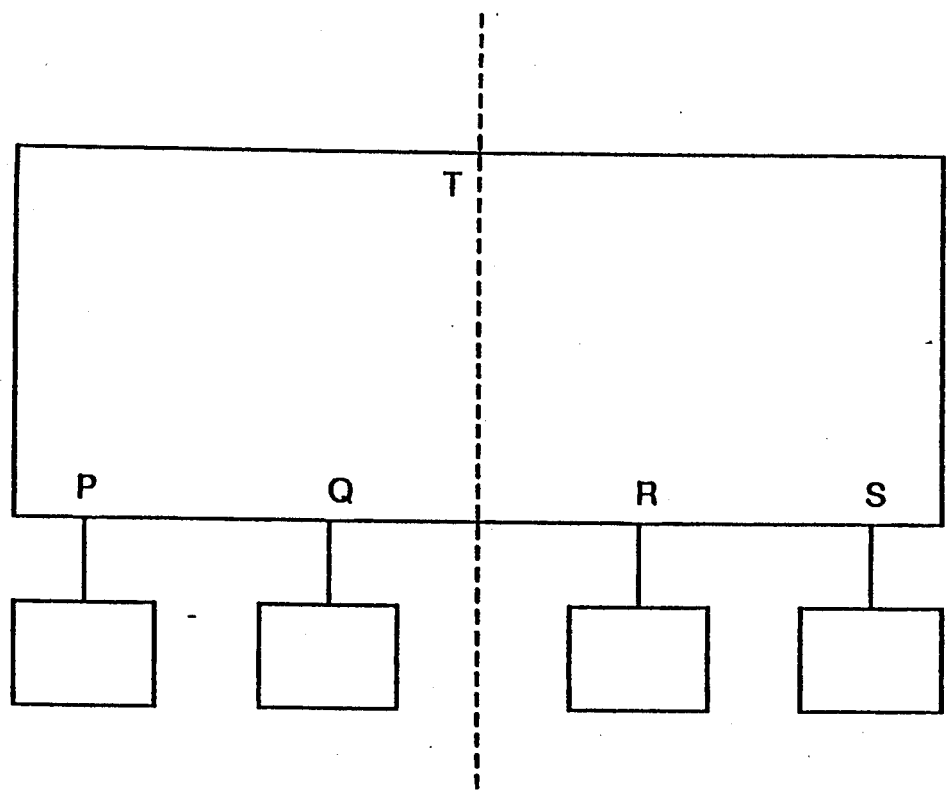
FIG. 10A is a block diagram of an example domain hierarchy.
Figure 10B:
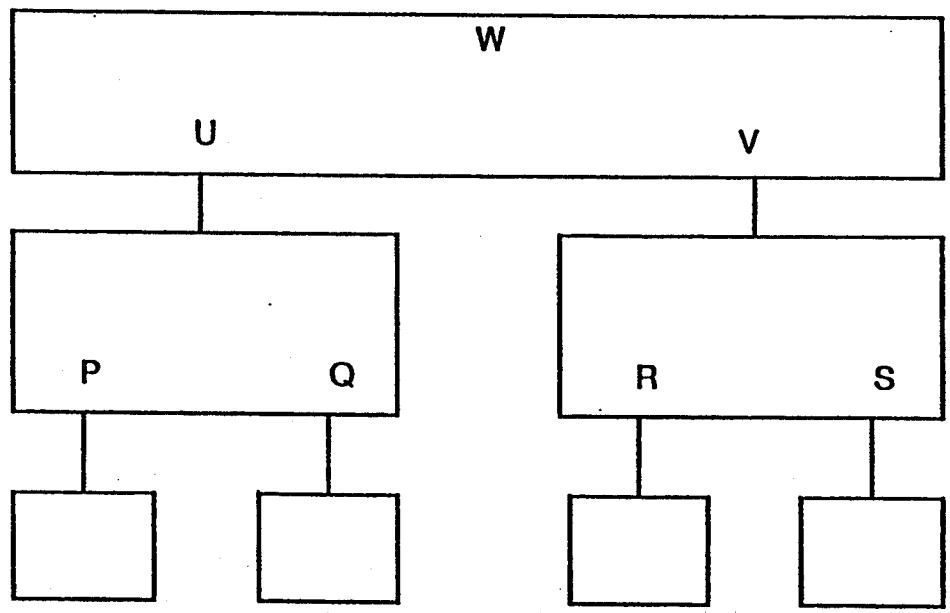
FIG. 10B illustrates the domain of FIG. 10A after a splitting operation.

FIGS. 10A and 10B illustrate the splitting of a single domain, with associated children domains, into two domains. Referring first to FIG. 10A, a parent domain T, with four children domains P, Q, R and S, is to be split into two separate domains U and V.

In this invention, the topmost level in the domain hierarchy has only a single domain. Therefore, a domain server must be created as a parent to the new domains U and V. As shown in FIG. 10B, domain W is created and stores the names of the two newly created children domains U and V. A directory is created for domain W to identify computer location and all domains served by its resident machine.

The directories of newly created domains U and V are updated to reflect the new "ownership" of the children domains P, Q, R and S. In this example, domains P and Q are now children domains of domain U and domains R and S are children domains of domain V.

Network Implementation

The network for implementing this invention includes connecting means, such as coaxial cable, to join a plurality of communication end points (computers). Each computer has an associated address so that different computers can be distinguished on the network and messages can be directed to a particular computer. A single computer may also host several users. Each computer also typically includes permanent mass storage, such as a disk drive for storing network information.

Directory Storage

Each directory is stored as a sequential list of bytes. Each directory includes the following:
1. A numeric ID
2. A numeric instance
3. The numeric ID of the parent directory
4. The numeric ID's of any subdirectories
5. The associated property list The mapping into a sequential list of bytes is as follows:
ID
instance
parent ID
number of subdirectories
   subdirectory ID 1
   subdirectory ID 2
   subdirectory ID(N)
number of properties
   number of bytes in property 1's name
      byte 1 of property 1's name
      byte 2 of property 1's name
      byte (N) of property 1's name
   number of values in property 1
      number of bytes in property 1, value 1
         byte 1 of property 1, value 1
         byte 2 of property 1, value 1
         byte (N) of property 1, value 1
      number of bytes in property 1, value 2
         byte 1 of property 1, value 2
         byte 2 of property 1, value 2
         byte (N) of property 1, value 2
   number of bytes in property 2's name
      byte 1 of property 2's name
      byte 2 of property 2's name
      byte (N) of property 2's name
   number of values in property 2
      number of bytes in property 2, value 1
         byte 1 of property 2, value 1
         byte 2 of property 2, value 1
         byte (N) of property 2, value 1
      number of bytes in property 2, value 2
         byte 1 of property 2, value 2
         byte 2 of property 2, value 2
         byte (N) of property 2, value 2

Each directory is stored as a list of bytes, and the lists are stored in a set of files. In the preferred embodiment, a file having directory partitions of a predetermined size, e.g. 256 bytes, stores the directories sequentially. Directory can be stored at offset 0, directory 1 at offset 256, and so on with directory N stored at offset 256 * N in the file, referred to herein as "Directory Collection".

Suppose directories 1 and 3 exist, but 2 does not. To recognize this fact, a special ID may be stored at offset 2*256 to signify the fact that this directory is unused and available for allocation. The special ID can be anything, and in this embodiment, is a negative 1 ($-1$).

If a directory is larger than 256 bytes, then it is stored in a separate file, not in the "Directory Collection" file. The file is given a unique name which indicates which directory it is storing. For example, directory 2 can be stored in file "extension_2" and directory 100 in file "extension_100".

When information is to be read from directory N, a test is made to see if the directory is too large to fit in the collection file. That is, the read of the information is attempted from file "extension_N". If this succeeds, then the information is found. Otherwise, offset N*256 of the collection file is read to determine the information.

When information is to be modified, it is first read using the above procedure, modified and then written out again. If it can fit in the collection file after modification, it is stored there. Otherwise, it is stored in an extension file.

To create a new directory, first an attempt is made to find any unused directories in the Directory Collection file (ID's of $-1$). If none are found, then a new free directory is created by extending the collection file by 256 bytes. In either case, the directory is given the ID associated with the free slot and stored either in the collection file or in an extension file (if it is too large to fit in the collection file).

Communication to Servers

Each database server has a unique communication address so that users may submit operations to it. The operations have input parameters and output parameters. The parameters themselves are serialized into a set of bytes using a procedure similar to the one described in the storage of directories into files above. The input packet to the server may be as follows:
   transaction ID
   operation ID
   serialized input parameters The transaction ID is used by the caller to match replies to requests. The operation ID indicates which operation the caller wishes to execute. The serialized input parameters are the parameters to the requested operation.

An output packet may be as follows:
   transaction ID
   status code
   serialized output parameters The transaction ID is the same as what the caller provided. The status code indicates if the operation completed successfully or if not, why it failed. If the operation succeeded, serialized output parameters follow.

The following is a list of operations that can be performed in the preferred embodiment of this invention. It should be noted that other operations may be implemented without departing from the spirit and scope of this invention. The current operations are as follows:
ROOT
SELF
PARENT
CREATE
DESTROY
READ
WRITE
CHILDREN
LOOKUP
LIST
CREATEPROP
DESTROYPROP
READPROP
WRITEPROP
RENAMEPROP
LISTPROPS
CREATENAME
DESTROYNAME
READNAME
WRITENAME A description, the input (if any) and output for each of these operations are as follows:
ROOT
  output:
    ID of root directory
    instance of root directory
SELF
  input:
    ID of any directory
  output:
    instance for that directory
PARENT
  input:
    ID of any directory
  output:
    instance of above directory
    ID of parent directory
CREATE
  input:
    ID of parent directory
    instance of above
    initial properties for new directory
  output:
    new instance of parent directory
    ID of newly created directory
    instance of newly created directory
DESTROY
  input:
    ID of parent directory
    instance of parent directory
    ID of directory to destroy
  output:
    new instance of parent directory
READ
  input:
    ID of any directory
  output:
    latest instance of directory
    property list for that directory
WRITE
  input:
    ID of any directory
    instance of above
    new property list for that directory
  output:
    new instance of directory
CHILDREN
  input:
    ID of directory
  output:
    instance of directory
    list of id's of subdirectories
LOOKUP
  input:
    ID of directory
    property name
    property value
  output:
    instance of directory
    list of subdirectory id's having property name and value combo
    ID
LIST
  input:
    ID of directory
    property name
  output:
    instance of directory
    list of all subdirectory ID's and if they have the above property name, their associated value list
CREATEPROP
  input:
    ID of directory
    instance of directory
    property
    location in property list for new property
  output:
    latest instance of directory
DESTROYPROP
  input:
    ID of directory
    instance of directory
    location in property list of property to be destroyed
  output:
    new instance of directory
READPROP
  input:
    ID of directory
    location in property list of property to be read
  output:
    instance of directory
    property
WRITEPROP
  input:
    ID of directory
    instance of directory
    location of property to modify
    new property
  output:
    new instance of directory
RENAMEPROP
  input:
    ID of directory
    instance of directory
    location of property to rename
  output:
    new instance of directory
LISTPROPS
  input:
    ID of directory
  output:
    instance of directory
    list of all property names in directory
CREATENAME input:
- ID of directory
- instance of directory
- location of property in property list to modify
- location of value in property's value list to create
- value output:
- new instance of directory DESTROYNAME
input:
- ID of directory
- instance of directory
- location of property in property list
- location of value in property's value list to destroy output:
- new instance of directory READNAME
input:
- ID of directory
- instance of directory
- location of property in property list to read
- location of value in property's value list to read output:
- instance of directory
- value WRITENAME
input:
- ID of directory
- instance of directory
- location of property in property list to modify
- location of value in property's value list to create
- value output:
- new instance of directory Thus, a method and apparatus for implementing a network database is described.

I claim:

1. A method of storing configuration information for a network of computers, said method comprising the steps of:
   on at least one computer of said network, executing operations for creating a domain hierarchy consisting of a plurality of domains, said domain hierarchy representing a logical organization of said network, each domain associated with said computers on said network, each domain including a name of each domain logically located above and logically located below said each domain in said domain hierarchy;
   said operations creating a directory tree within each of said domains, each said directory tree including one or more directories for storing information associated with each domain and information associated with resources and services of said computers available to each domain; and,
   said operations storing each directory tree on storage media of said computers within the domain associated with said directory tree.

2. The method of claim 1 wherein each directory stores information in an ordered list of properties, where each property consists of a property name and an ordered list of values associated with said property name.

3. The method of claim 1 wherein copies of each said directory tree are stored on said computers in said domain associated with said directory tree.

4. A method for storing logical configuration information in a network database, said method comprising the steps of:
   executing on at least one computer of said network operations for creating an ordered list of properties of a directory of a directory tree of a domain associated with said computers of said network, each property of said list of properties containing a name and an ordered list of values, said each property defining a subset of said logical configuration information;
   said operations defining a name for each property;
   said operations defining an ordered list of values associated with each said name, said values representing said subset of said logical configuration information associated with said property; and,
   said operations storing said property list, names and values on a storage media of said computers.

5. A method of storing configuration information for a network of computers, said method comprising the steps of:
   executing on at least one computer of said network operations for creating a domain hierarchy of one or more domains, said logical domain hierarchy representing a logical organization of said network, each domain associated with one or more computers on said network, each domain including a name of each domain logically located above and logically located below said domain in said domain hierarchy;
   said operations creating a directory tree within each of said domains, each said directory tree including one or more directories for storing information associated with each domain and resources and information associated with resources and services of said computers available to each domain, each directory storing information in an ordered list of properties, where each property consists of a property name and an ordered list of values associated with said property name;
   restricting access by users to values associated with a first property by creating a second property associated with said first property, said second property containing an ordered list of values that identify permissible access to said first property's values;
   said operations storing each directory tree on a storage media of said computers within the domain associated with said directory tree;
   said operations comparing a user's identification with said second property's values when said user attempts to access said first property's values; and
   said operations denying access by said user to said first property's values when said second property's values do not include said user's identification.

* * * * *